United States Patent [19]

Cardoza et al.

[11] Patent Number: 4,582,602
[45] Date of Patent: Apr. 15, 1986

[54] LOW PROFILE PLATE FILTER

[75] Inventors: Richard E. Cardoza, Tiburon; Fabian F. Soukup, Dillon Beach, both of Calif.

[73] Assignee: J. R. Schneider Co., Inc., Corte Madera, Calif.

[21] Appl. No.: 632,505

[22] Filed: Jul. 19, 1984

[51] Int. Cl.$^4$ ............................................. B01D 25/12
[52] U.S. Cl. ..................................... 210/230; 100/199
[58] Field of Search .............................. 210/225–227, 210/230, 97, 387; 209/405, 309, 315, 319; 100/194, 199, 197, 198, 196; 74/104, 106, 107

[56] References Cited

U.S. PATENT DOCUMENTS

| | | | |
|---|---|---|---|
| 2,867,324 | 1/1959 | Hirs | 210/97 |
| 2,867,325 | 1/1959 | Hirs | 210/97 |
| 2,867,326 | 1/1959 | Hirs | 210/104 |
| 2,918,862 | 12/1959 | Monroe et al. | 100/198 |
| 3,237,463 | 3/1966 | McPherson | 74/106 |
| 3,608,734 | 9/1971 | Schneider | 210/387 |
| 3,968,040 | 7/1976 | Ostrop | 210/225 |
| 4,102,788 | 7/1978 | Broad | 210/230 |
| 4,142,933 | 3/1979 | Graham | 210/225 X |
| 4,329,228 | 5/1982 | Crowe et al. | 210/230 |
| 4,362,617 | 12/1982 | Klepper | 210/230 X |
| 4,397,744 | 8/1983 | Haruo | 100/198 X |

FOREIGN PATENT DOCUMENTS

| | | | |
|---|---|---|---|
| 2404150 | 8/1974 | Fed. Rep. of Germany | 100/199 |
| 54-69875 | 6/1979 | Japan | 210/230 |

Primary Examiner—Richard L. Chiesa
Attorney, Agent, or Firm—Townsend and Townsend

[57] ABSTRACT

A filter includes a lower filter plate mounted to a frame, an upper filter plate movably mounted above the lower filter plate and filter paper between the two plates. A number of shafts are mounted to the frame below the lower filter plate and extend past opposite sides of the filter. Elongate crank arms and eccentrically positioned tie rod connection pins are secured to the ends of the shafts. The upper ends of the tie rods are mounted to opposite sides of the upper filter plate. The tie rods' lower ends are pivotally mounted to the tie rod connections for eccentric movement about the axes of the shafts. A pneumatic ram is used to rotate one of the shafts through an actuator arm keyed to the shaft. The outer ends of the crank arms on each side are coupled together by connecting bars so the crank arms move in unison. A locking arm is mounted to one of the shafts and is positioned to engage locking recesses in upper and lower locking dogs when the upper filter plate is fully opened and fully closed. The locking dogs are biased to normally engage the locking arm and are selectively pivoted away from the actuator axis to release the locking arm when the filter is being opened or closed.

30 Claims, 5 Drawing Figures

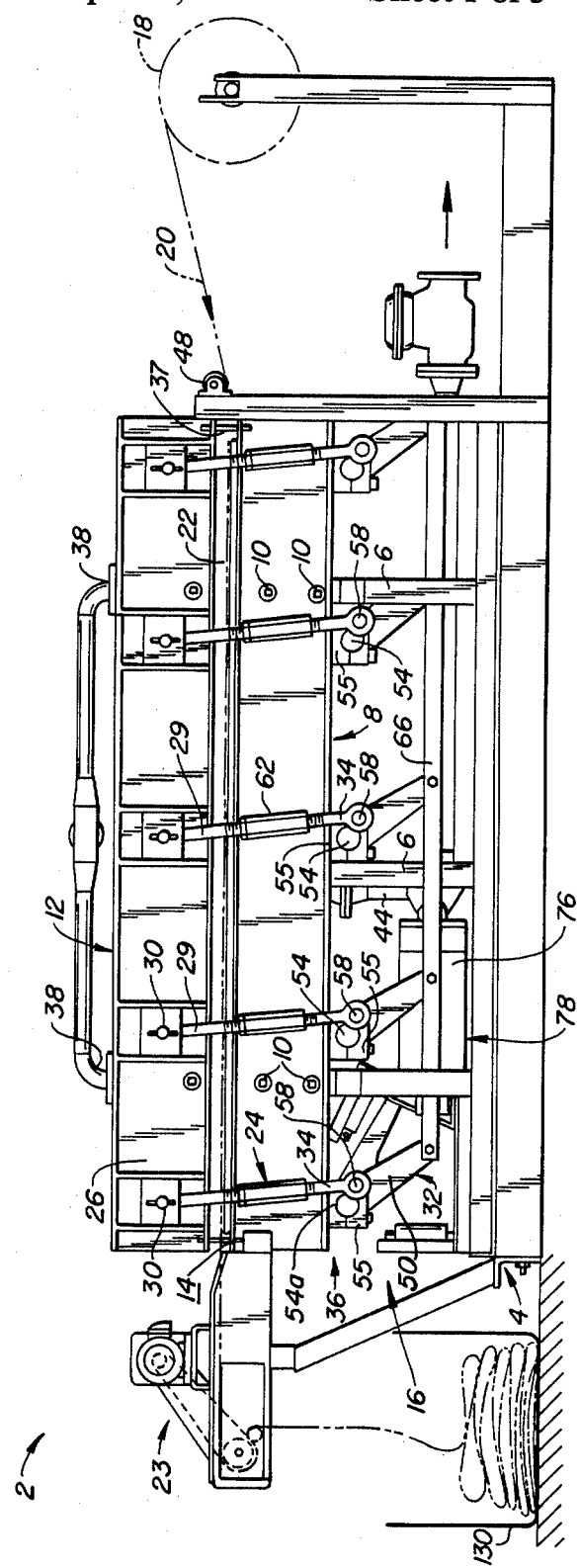
FIG.—1.

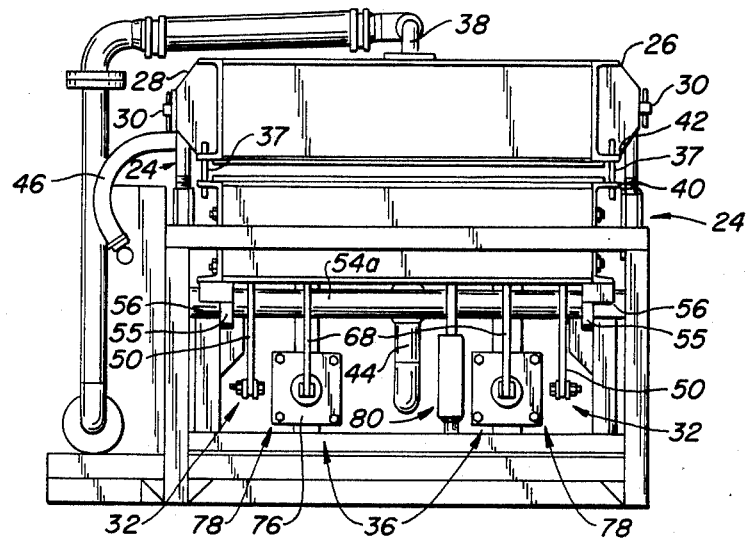
FIG._2.
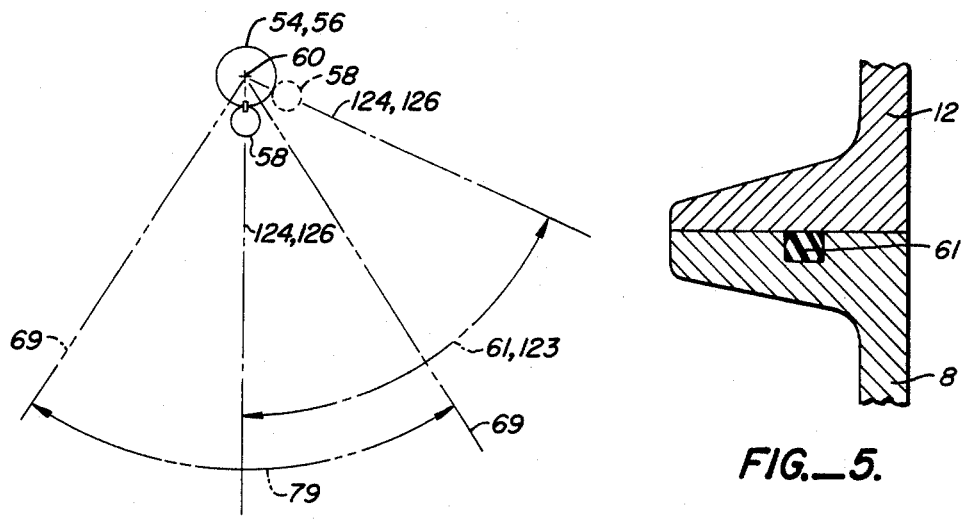
FIG._4.
FIG._5.

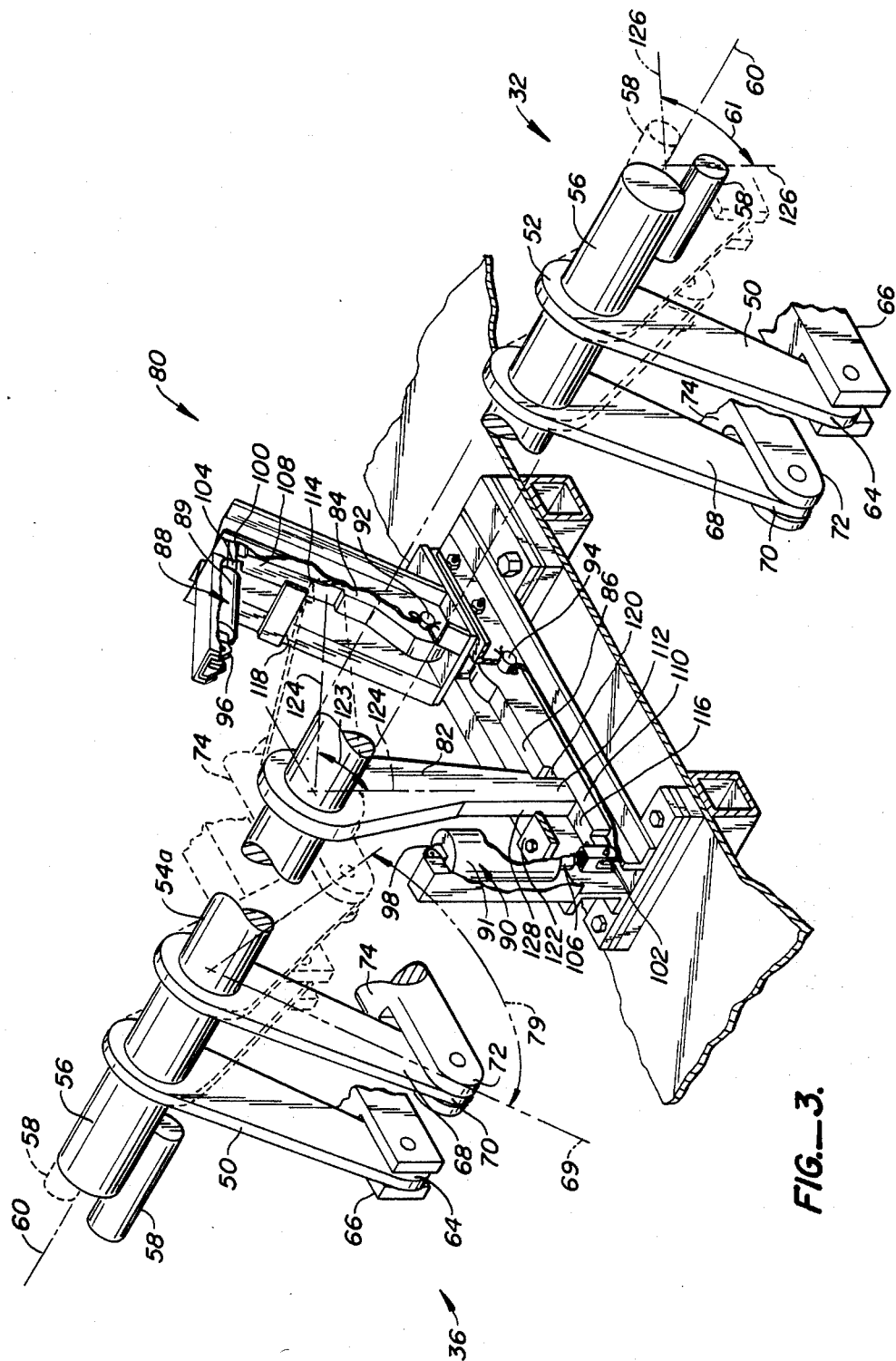

LOW PROFILE PLATE FILTER

BACKGROUND OF THE INVENTION

This invention is related to industrial plate filters of the type used to filter liquids, such as the liquid coolants used during metal working operations, and more particularly to a low profile plate filter using only a single pair of filter plates.

During certain industrial processes large quantities of liquids must be filtered for reuse. One way to filter these liquids is with a stacked plate filter such as described in U.S. Pat. No. 3,608,734. Such filters direct the liquid through a number of filter plates stacked on top of one another and arranged for the parallel flow of liquid through them. With this arrangement, a central jack is used to seal the upper and lower surfaces of the filter plates. Although stacked plate filter apparatus is relatively expensive, because of the necessary multiple filter plates and associated filter paper rolls and filter paper extractor assemblies, they have proven to be reliable, efficient and are presently in wide use.

U.S. Pat. No. 2,867,236 to Hirs discloses filters of an older design which employ one or more pairs of stacked filter plates and various means for replacing contaminated filter media. It also discloses a gear drive mechanism for separating the filter plates or, alternatively, a pneumatic actuator mounted at the center of one of a pair of cooperating plates for raising and lowering the plate to permit the replacement of filter medium. By directly coupling the pneumatic actuator to one of the plates any pressure loss in the actuator, due to leaking seals, for example, can result in leakage of fluid from between the plates which, of course, is highly undesirable.

SUMMARY OF THE INVENTION

The present invention is directed to a low profile plate filter which is simple in construction, fast in operation, capable of handling high flow rates and relatively inexpensive to build.

Generally speaking, the filter of the invention includes a lower filter plate mounted to a frame and an upper filter plate movably mounted above the lower filter plate. The upper filter plate is moved between an open position, in which the filter medium, e.g. filter paper can be pulled through a gap between the upper and lower filter plates, and a closed position, in which the region between the abutting filter plates is sealed thus capturing the filter paper between the filter plates. A fluid, typically industrial cooling oil, is pumped through an inlet in the upper filter plate, passes through the filter paper and into the lower filter plate where it collects at and passes through an outlet for further use.

The upper filter plate is supported by a number of eccentrically actuated tie rods pivotally mounted at their upper ends to opposite sides of the upper filter plate. The lower ends of the tie rods are pivotally mounted to and supported by a number of tie rod connectors. The tie rod connectors are mounted to the frame for eccentric movement about respective axes. Each tie rod connector is rigidly connected to an elongate crank arm so both the tie rod connectors and the crank arms rotate about their respective axis. The crank arms on each side of the filter are coupled together by connecting bars so that movement of one crank arm and tie rod connection therewith causes corresponding movement of the crank arms and tie rod connections to which it is connected.

An actuator rotates the crank arms and tie rod connectors on both sides of the filter between first and second angular orientations. This is typically accomplished through an actuator arm keyed to an actuator shaft mounted to the frame below the lower filter plate; a crank arm and tie rod connection is secured at each end of the actuator shaft. When the actuator arm is at the first angular orientation, the tie rod connection is preferably at, slightly past or near bottom dead center and the upper filter plate is closed against the lower filter plate. When the actuator arm is at the second angular orientation, the tie rod connection is moved away from bottom dead center so to raise the upper filter plate.

If pressure is lost to the pneumatic actuator, a safety locking assembly keeps the upper filter plate in position—that is fully closed or fully open. The safety locking assembly includes a locking arm mounted to the actuator shaft and positioned to engage upper and lower locking dogs when the upper filter plate is fully opened and fully closed. The locking dogs each have a locking recess for selective engagement of the end of the locking arm. The locking dogs are pivotally mounted to the frame and are biased towards the actuator axis to engage the locking arm. When the pneumatic actuator is energized, the locking dogs are pivoted away from the actuator axis to allow the free movement of the locking arm.

The filter of the invention has a low profile and therefore can be transported assembled, which is not always possible with conventional filters. The low profile aspect of the filter also allows it to be mounted on top of liquid containers while still being serviceable from the ground without requiring special platforms, walkways, scaffolding and so forth.

Another advantage of the filter made according to the invention is that it is substantially less expensive to manufacture than prior art filters having the same filter area, at least in part because it requires only a single filter paper extractor or, alternatively, the extractor can be eliminated and filter paper can be manually replaced to achieve even further cost savings. Also, the cleaning cycle time is much shorter than that required by prior art filters operated with a motor and gear drive, for example, which raises and lowers the plates during filter paper replacement. The filter of the invention requires a cleaning cycle time on the order of seconds, while filters of the prior art commonly take minutes. The quick cleaning cycle time is enhanced by the use of a roll of filter paper and an automatic paper extractor which automatically replaces the used filter paper between the upper and lower filter plates with clean filter paper. Thus, with the filter of the present invention a cleaning cycle can be completed in as little as 3–4 minutes while prior art filters often require up to 15 minutes.

The short filter cleaning cycle makes it possible to operate the filter with smaller storage reservoirs for clean and contaminated liquids to sustain the continued operation of the metal working or other process which uses the liquid. At high flow rates through the filter, which may reach several hundred or even thousands of gallons per minute, significant savings can thereby be achieved.

Another advantage of the invention is that the liquid to be cleaned can be directed through inlets on the top of the upper filter plate and out of an outlet on the bottom of the lower filter plate. This achieves an even distribution of the liquid over the entire filter area and permits flow rates as high as 75-90 gals/min/square foot of filter area.

Since the tie rods are eccentrically driven, great mechanical advantage can be obtained during closing of the filter. That is, by adjusting the tie rods so that the filter is closed when the tie rod connection is at bottom dead center, a great amount of closing force can be exerted on the upper filter plate at the end of the closing stroke of the actuator. Doing so makes it unnecessary to subject many of the other components, such as the connecting bars, to correspondingly high forces.

By employing tie-rods to move the filter plates relative to each other the need for a relatively expensive support frame is eliminated, thereby reducing the overall cost of the filter. Yet, the tie rod secures the opposite, typically elongate sides to each other at relatively short intervals so that leakage between the plates is prevented even when the internal liquid pressure is relatively high and/or the plates are of a large size, say up to 35 square feet or more. An additional advantage afforded by the filter of the present invention is that several filters, say up to three or four, can be arranged one behind the other to triple or quadruple the filtration capacity. By serially positioning the filters in the direction of paper movement through them, a single paper extractor can be employed, thereby simplifying the entire installation and reducing installation and operating costs.

Other features and advantages of the present invention will appear from the following description in which the preferred embodiment has been set forth in detail in conjunction with the accompanying drawings.

BRIEF DESCRIPTION OF THE DRAWINGS

FIG. 1 is a side view of the low profile filter made according to the invention when open.

FIG. 2 is an end view of the filter of FIG. 1 with the paper extractor omitted for clarity.

FIG. 3 is an enlarged isometric view showing the crank member assembly, crank member drive assembly and safety locking assembly as they would appear when the filter is closed.

FIG. 4 is a schematic representation of the relative angular orientations of the various raising and lowering assembly components.

FIG. 5 is a fragmentary, side elevational view, in section, of a sealing arrangement between the closed plates of the filter.

DETAILED DESCRIPTION OF THE PREFERRED EMBODIMENT

Referring now to FIGS. 1 and 2, a low profile filter 2 includes generally a frame 4 having a number of upstanding legs 6 to which a lower filter plate 8 is mounted by bolts 10. An upper filter plate 12 is movably mounted directly above the upper surface 14 of lower filter plate 8 through a raising and lowering assembly 16. A filter paper roll 18 is mounted to frame 4 at one end to allow filter paper 20 to be drawn through the gap 22 between upper and lower filter plates 12, 8 when filter 2 is in the open condition of FIG. 1. Filter paper 20 is pulled through gap 22 by a paper extractor 23 mounted to the end of frame 4 opposite paper roll 18.

Raising and lowering assembly 16 includes five tie rods 24 mounted to each lateral side 26, 28 (see FIG. 2) of upper filter plate 12. The upper ends 29 of tie rods 24 are pivotally secured to upper filter plate 12 at pivot points 30. Raising and lowering assembly 16 also includes a number of crank member assemblies 32 connected to the lower end 34 of the tie rods 24 and a pair of crank member drive assemblies 36 operably coupled to the crank member assemblies as described below. The vertical movement of upper filter plate 12 is guided by a pair of guides 37 secured to opposite corners of upper and lower filter plates 12, 8.

Briefly, crank member drive assembly 36 drives crank member assemblies 32 which cause tie rods 24 to be raised and lowered in unison, thus raising and lowering upper filter plate 12. After lowering upper filter plate 12, a liquid to be cleaned is pumped into upper filter plate 12 through inlets 38, passes through filter paper 20 captured between the outer edges 40, 42 of lower and upper filter plates 8, 12 respectively, into lower filter plate 8 and finally out outlet 44. Once filter paper 20 has become sufficiently clogged, liquid flow into upper filter plate 12 is halted and the liquid within upper filter plate 12 is allowed to either drain through filter paper 20 or is removed through a quick blow down outlet 46 (FIG. 2). After upper filter plate 12 has been drained, raising and lowering assembly 16 operates to raise upper filter plate 12 a short distance, for example 1½ inches. Paper extractor 24 pulls the dirty filter paper 12 from between plates 8, 12 so that clean filter paper 20 from roll 18 takes its place. The amount of filter paper 20 pulled through filter 2 is monitored by a roller 48 which provides a series of pulses to paper extractor 23; paper extractor 23 stops pulling filter paper 20 through filter 2 when all the dirty filter paper has been removed from between filter plates 8, 12. Thereafter, assembly 16 lowers upper filter plate 12 onto lower filter plate 8 with force sufficient to seal edges 40, 42 from leaks. Filter 2 is now ready to begin filtering liquid again.

A crank arm 50 is mounted at its upper end 52 to the outer ends of five shafts 54. Shafts 54 are mounted to frame 4 beneath lower filter plate 8 by bearings 55. The left most shaft 54 of FIG. 1 is illustrated in FIG. 3 and is designated actuator shaft 54a for reasons which will be evident in light of the discussion below. However, shafts 54 and 54a are structurally the same. Arms 50 are keyed, welded or otherwise secured to shafts 54. A shaft extension 56 of shaft 54 extends through crank arms 50 and has a tie rod connection pin 58 welded to its periphery and extending parallel to the axis 60 of each shaft 54. Crank member assembly 32, in this preferred embodiment, thus includes crank arms 50, shaft extensions 56 and tie rod connection pins 58.

Lower ends 34 of tie rods 24 are pivotally mounted to tie rod connection pins 58. Rotation of a shaft 54 causes pins 58 at either end to move about an axis 60 of shaft 54 and along arcs 61 (FIG. 3); this imparts an eccentric motion to the lower ends 34 of tie rods 24 thus causing tie rods 24 to move vertically to raise and lower upper filter plate 12. Although pins 58 are shown connected to shaft extensions 56, they could also be connected elsewhere, such as directly to crank arms 50 depending in part upon the size and placement of bearings 55.

In use, the pins 58 are rotated until they reach dead center relative to pivot 30 on upper plate 12 to effectively lock the plates to each other in their closed position. The locking action can be enhanced by rotating the pins 58 slightly, i.e. a few degrees past dead center. The locking action is further increased when a relatively thick, resilient filter media is used, or when thin media is used, by including a seal ring, such as an O-ring 61 (FIG. 5) between the upper and lower plates 12, 8, respectively. The filter media, or the O-ring, generate maximum compression forces when the pin 58 is at dead center and the forces are slightly less if there is overtravel. As a result, to release the lock, the torque required to rotate pin 58 past dead center must first increase before the liquid pressure between the plates can become effective to separate the plates.

Tie rods 24 each include a turnbuckle section 62 so tie rods 24 are adjustable in length. The use of turnbuckle sections 62 will be described below. The outer ends 64 of the crank arms 50 along each lateral side 26, 28 are connected to one another through connecting bars 66. Thus movement of one crank arm 50 causes corresponding movement of each of the crank arms connected to one another by the same bar 66.

Actuator shaft 54a includes a pair of actuator arms 68 keyed or otherwise affixed at their upper ends to shaft 54a. Arms 68 point in the same radial direction 69 as crank arms 50 secured to either end of shaft 54a (see also FIG. 4); this is why arms 68 are not visible in FIG. 1. The lower ends 70 of arms 68 are connected to the outer ends 72 of pneumatic rams 74. Rams 74 are powered by double acting pneumatic cylinders 76 (see FIG. 1) which supply the energy to rotate actuator arms 68 and actuator shaft 54a therewith, thus raising and lowering tie rods 24 and upper filter plate 12. Pneumatic rams 74 and pneumatic cylinders 76, together termed pneumatic actuators 78, are used to drive actuator arms 68 between a first position, shown in dashed lines in FIG. 3 and representing the open position of upper filter plate 12 of FIGS. 1 and 2, and a second position, shown in solid lines in FIG. 3 and corresponding to filter plate 12 being in a closed position (not shown) with upper filter plate 12 seated on upper surface 14 of lower filter plate 8. This arc of travel 79 is approximately 66° and is illustrated schematically in FIG. 4. Crank member drive assembly 36 thus includes actuator shaft 54a, actuator arms 68, pneumatic actuators 78 and connecting bars 66.

In the preferred embodiment only a single shaft 54, actuator shaft 54a, is driven. However, two or more of shafts 54 may be driven by an actuator 78 if desired. Also some or all of shafts 54 need not have a crank member assembly 32 at each end, although the forces are better balanced when they do.

A safety locking assembly 80 is used in conjunction with actuator shaft 54a to lock upper filter plate 12 in either its closed, sealed position or its open position. Assembly 80 includes broadly an elongate locking arm 82 fixed at its upper end to shaft 54a, upper and lower locking dogs 84, 86, and upper and lower spring biased actuators 88, 90 operably coupled to locking dogs 84, 86. An assembly 80 may be used in conjunction with other shafts 54 in addition to or in lieu of its use with shaft 54a.

Upper and lower locking dogs 84, 86 are pivotally mounted to frame 4 at pivots 92, 94. The cases 89, 91 of upper and lower spring biased actuators 88, 90 are pivotally mounted to frame 4 at pivots 96, 98. The outer ends 100, 102 of the piston rods 104, 106 of actuators 88, 90 are pivotally connected to the outer ends 108, 110 of upper and lower locking dogs 84, 86. Actuators 88, 90 normally pull on outer ends 108, 110 to bias outer ends 108, 110 towards actuator axis 60. This allows the distal end 112 of locking arm 82 to be captured within locking recesses 114, 116 formed in locking dogs 84, 86 when upper filter plate 12 is in either its fully opened or fully closed position. Accordingly, recesses 114, 116 are positioned so that when actuator arm 68 is in its first position, shown in dashed lines in FIG. 3, distal end 112 of locking arm 82 is captured within locking recess 114; when actuator arm 68 is in its second, solid line position, distal end 112 is captured within recess 116. Lower locking dog 86 has a second locking recess 120 to accommodate a second final position of locking arm 82 when filter paper 20 is thicker than average.

An upper limit stop 118, secured to frame 4, keeps locking arm 82 from moving past it in a counterclockwise direction (as seen in FIGS. 1 and 3) thus limiting how far upper filter plate 12 opens. A lower limit stop 122, also secured to frame 4, limits the pivotal movement of locking arm 82 in a clockwise direction as shown in FIG. 3. Some filter paper is relatively thick, sometimes up to 3/16 inch thick, but does not compress as much when dry as when wet. To allow for this extra compression during use, stop 122 is preferably positioned so that there is a small gap 128, for example ¼ inch, between lower limit stop 122 and locking arm 82 when arm 82 is at bottom dead center.

Upon actuation of air cylinders 76, both upper and lower spring biased actuators 88, 90 become active so that their respective piston rods 104, 106 extend to pivot locking dogs 84, 86 away from actuator axis 60. This permits locking arm 82 to pivot between its first position, shown in dashed lines in FIG. 3, and its second position, shown in solid lines, along arc 123. Once this has occurred, spring biased actuators 88, 90 are deenergized causing their piston rods 106, 108 to be withdrawn thus pulling outer ends 108, 110 of upper and lower locking dogs 84, 86 towards actuator axis 60 to lock arm 82 in place.

It should be noted that the center line 124 of locking arm 82 is radially aligned with a line 126 connecting actuator axis 60 and the center of tie rod connection pin 58. Thus when pin 58 is a bottom dead center so that axis 126 is vertical, axis 124 is also vertical. This alignment is illustrated schematically in FIG. 4.

In use, and assuming upper filter plate 12 is in its open position of FIG. 1, filter paper 20 from roll 18 is directed through gap 22 between upper and lower filter plates 12, 8 and threaded through paper extractor 23. Assembly 16 is actuated to lower upper filter plate 12 onto lower filter plate 8 thereby capturing the peripheral edges of filter paper 20 between outer edges 40, 42 of lower and upper filter plates 8, 12. This is accomplished by actuating pneumatic cylinders 76 causing actuator arms 68 to rotate from their first (dashed line) positions in FIG. 3 to their second (solid line) positions. At the same time, or immediately before, spring biased actuators 88, 90 are powered thus pivoting upper and lower locking dogs 84, 86 away from actuator axis 60 to allow locking arm 82 to swing freely between its first (dashed line) position and second (solid line) positions. Since actuator shaft 54a includes a crank arm 50 at either end and since all crank arms 50 on either side of filter 2 are coupled together by connecting bars 66, rotation of actuator shaft 54a causes all other actuator shafts 54, through their respective crank arms 50, to rotate as well. Tie rod connection pins 58 all rotate about their associated axes 60 until pins 58 are at about bottom dead center and their respected axes 126 are generally vertical. Spring biased actuators 88, 90 are de-energized so dogs 84, 86 are pivoted toward axis 54a by actuators 88, 90 to capture distal end 112 within locking recess 116 of lower dog 86. Turnbuckle sections 62 are then all tightened to the same torque to achieve even pressure on both sides of filter 2. Liquid is then introduced into upper filter plate 12 through inlets 38, filtered as it passes through filter paper 20 captured between upper and lower filter plates 12, 8 and exits through outlet 44.

When it is necessary to replace the filter paper, the flow of liquid through inlets 38 is halted and the liquid within the upper filter is removed through quick blow down outlet 46. After upper filter plate 12 is empty, pneumatic actuators 78 are operated to pull actuator arms 68 from their second, solid line positions of FIG. 3, back to their first broken line positions of FIG. 3. At the same time, or just before, spring biased actuators 88, 90 are energized thus pivoting upper and lower locking dogs 84, 86 away from actuator axis 60a to allow locking arm 82 to swing freely between its second and first positions. Rotation of actuator arms 68 causes actuator shaft 54a to rotate thus driving tie rod connection pins 58 attached at either end in a counterclockwise direction to raise tie rods 24 and thus raise upper filter plate 12. When actuator arms are in their first, dashed line positions of FIG. 3, spring biased actuators 88, 90 are de-energized to allow dogs 84, 86 to pivot toward shaft 54a to lock distal end 112 of locking arm 82 within locking recess 114. This keeps upper filter plate 12 open even if pressure to pneumatic cylinders 76 is lost. Filter paper is then advanced through filter 2 by paper extractor 24. Paper extractor 24 pulls paper 20 until a sufficient amount of paper, as indicated by signals from roller 48, has been pulled through filter 2. The used filter paper is collected in a refuse bin 130. The cycle can now be repeated.

Modification and variation can be made to the disclosed embodiment without departing from the subject of the invention as defined in the following claims. For example, various types of filter paper extractors may be used in lieu of extractor 24. The filter media used need not be from a roll of filter paper, and need not even be filter paper. Filter plates 8, 12 may be of other shapes, say of a square shape; however rectangular filter plates work well for relatively large filter areas, particularly when using continuous feed filter paper.

We claim:

1. A plate filter comprising:
   a frame;
   a first filter plate mounted to the frame;
   a second filter plate configured for complementary mating engagement with said first filter plate to define a filtering region therein;
   the filter plates being arranged so that filter media can be removably positioned within the filtering region; and
   means for mounting said second filter plate for movement relative to said first filter plate between a closed position in which said filter media can be captured between said filter plates and an open position in which said filter media can be removed from between said filter plates, said mounting means comprising:
      a plurality of elongated crank arms pivotally mounted to said frame for pivotal movement about respective first axes;
      a plurality of eccentric members positioned eccentric of said first axes;
      means for rigidly coupling said eccentric members to said crank arms so eccentric movement of said eccentric members about said first axes coincides with pivotal movement of crank arms about said first axes;
      a plurality of tie rods having first and second ends and being pivotally connected at their second ends to said second filter plate, the first ends of said tie rods being pivotally connected to said eccentric members; and
      means for driving said eccentric members about their respective first axes between first and second rotary positions corresponding to said open and closed positions of said second filter plate with the movement of said eccentric members about said first axes driving said second filter plate between said open and closed positions.

2. The plate filter of claim 1 wherein said rigidly coupling means includes shaft extensions secured to and extending from said crank arms coaxially with said first axes, and wherein said eccentric members include tie rod connections fixed to said shaft extensions at positions eccentric of said first axes.

3. The plate filter of claim 1 wherein said first filter plate is rigidly mounted to the frame.

4. The plate filter of claim 1 wherein said second filter plate overlies said first filter plate.

5. The plate filter of claim 4 further comprising a liquid inlet in the second filter plate and a liquid outlet in the first filter plate.

6. The plate filter of claim 1 wherein said first and second filter plates are rectangular.

7. The plate filter of claim 6 wherein said tie rods are mounted along at least two sides of said first and second filter plates.

8. The plate filter of claim 7 wherein said at least two sides are opposite sides.

9. The plate filter of claim 8 further comprising at least one shaft connecting eccentric members on the opposite sides of the filter plates.

10. The plate filter of claim 9 wherein said at least one shaft and associated eccentric members are rigidly secured to one another.

11. The plate filter of claim 1 wherein said filter media is removably positioned between said first and second filter plates.

12. The plate filter of claim 11 wherein said filter media is filter paper.

13. The plate filter of claim 12 further comprising a supply of said filter paper located on one side of the filter plates and a paper extractor located on the opposite side of the filter plates.

14. The plate filter of claim 1 wherein said eccentric members driving means includes connecting bar means for operationally coupling a set of said crank arms so movement of one of said set of crank arms causes corresponding movement of the others of said set of crank arms.

15. The plate filter of claim 14 wherein at least a portion of said tie rods are connected to opposite sides of said second filter plate.

16. The plate filter of claim 15 further comprising first and second crank arms sets on the opposite sides of said second filter plate, said crank arms within each said set being operationally coupled by said connecting bar coupling means.

17. The plate filter of claim 16 wherein said eccentric member driving means further comprises a shaft coincident with one said first axis and being rigidly connected at either end of said shaft to a crank arm in said first and second crank arm sets so said crank arms in said first and second crank arm sets and said shaft move in unison.

18. The plate filter of claim 17 further comprising a plurality of said shafts.

19. The plate filter of claim 17 wherein said eccentric member driving means further comprises an actuator arm drivingly connected to said shaft and a ram connected to the actuator arm for rotating said actuator arm and said shaft and said crank arms therewith to move the second filter plate between the open and closed positions.

20. The plate filter of claim 17 wherein said second filter plate mounting means includes means, operably coupled to said shaft, for releasably locking said shaft in first and second rotary positions corresponding to said open and closed positions of said second filter plate.

21. The plate filter of claim 14 further comprising means for limiting the pivotal movement of said set of crank arms between first and second angular positions, said first and second angular positions corresponding to the second filter plate open and closed positions.

22. The plate filter of claim 14 further comprising means for locking said set of crank arms at first and second angular positions corresponding to the second filter plate open and closed positions.

23. The plate filter of claim 14 wherein said eccentric member driving means further comprises:
 a shaft to which at least one said crank arm is fixed, said shaft being coaxial with the first axis of said at least one crank arm;
 an elongate actuator arm extending radially from said actuator shaft and fixed thereto; and
 means for rotating said actuator arm, and said actuator shaft and said at least one crank arm therewith, about the first axis of said at least one crank arm, so said set of crank arms move about their respective first axes according to the rotary position of said actuator arm.

24. The plate filter of claim 23 wherein said at least one crank arm is secured to the shaft at one end of said at least one crank arm and to said connector bar means at another end of said at least one crank arm.

25. The plate filter of claim 23 further comprising:
 a locking arm fixed to and extending radially from said shaft;
 upper and lower locking dogs pivotally mounted to the frame and biased toward said shaft;
 said upper and lower locking dogs including respective upper and lower locking recesses positioned to engage an outer end of said locking arm to substantially limit the movement of said locking arm when said second filter plate is in either the open or the closed positions; and
 means for selectively pivoting said upper and lower locking dogs away from said shaft to disengage a distal end of the locking arm from the upper or lower locking dog recesses to allow said actuator arm rotating means to rotate said actuator arm thereby moving said second filter plate between its open and closed positions.

26. The plate filter of claim 1 wherein said second filter plate mounting means further comprising means for releasably locking said second filter plate in said open and closed positions.

27. A plate filter comprising:
 a frame;
 a lower filter plate mounted to the frame;
 an upper, overlying filter plate configured for complementary mating engagement with said lower filter plate to define a filtering region therein, said upper and lower filter plates each having first and second parallel, spaced apart lateral sides and first and second ends connecting the lateral sides;
 means for locating a supply of filter media at the first ends of the filter plates;
 a paper extractor means, located at the second ends of the filter plates, for pulling the filter media from the filter media supply and between the filter plates; and
 means for mounting said upper filter plate for movement relative to said lower filter plate between a closed position in which said filter paper is captured between said filter plates and an open position in which said filter paper is free to be removed from between said filter plates, said mounting means comprising:
 a plurality of shafts rotatably mounted to the frame for movement about first axes, said shafts extending between the first and second lateral sides;
 a plurality of crank member assemblies mounted to the ends of said shafts, said crank member assemblies including axially extending eccentric members and radially extending elongate crank arms mounted to both ends of said shafts, said eccentric members positioned for eccentric movement about said first axes, said eccentric members and crank arms connected to one another so eccentric movement of said eccentric members about said first axes coincides with pivotal movement of said crank arms about said first axes;
 a plurality of tie rods having first and second ends and being pivotally connected at their second ends to said second filter plate along the first and second lateral sides thereof, the first ends of said tie rods being pivotally connected to said eccentric members;
 first and second connecting bars coupling the crank arms on the respective first and second lateral sides of the filter plates;
 an actuator arm drivingly connected to at least one of said shafts; and
 a ram connected to the actuator arm for rotating said actuator arm and said at least one shaft and said crank member assemblies therewith to move the upper filter plate between the open and closed positions.

28. The plate filter of claim 27 further comprising:
 means for limiting the pivotal movement of said crank member assemblies between first and second angular positions, said first and second angular positions corresponding to the upper filter plate open and closed positions; and
 means for selectively locking said set of crank arms in said first and second angular positions.

29. The plate filter of claim 28 wherein said locking means further comprises:
 a locking arm fixed to and extending radially from a first of said shafts;
 upper and lower locking dogs pivotally mounted to the frame and biased toward said first shaft;
 said upper and lower locking dogs including respective upper and lower locking recesses positioned to engage an outer end of said locking arm to substantially limit the movement of said locking arm when said upper filter plate is in either the open or the closed positions; and means for selectively pivoting said upper and lower locking dogs away from said first shaft to disengage a distal end of the locking arm from the upper or lower locking dog recesses to allow said actuator arm rotating means to rotate said actuator arm thereby moving said upper filter plate between its open and closed positions.

30. The plate filter of claim 27 comprising a plurality of plate filters serially arranged relative to each other end to end, and wherein the means locating the filter media supply is located at the first end of a first of the plurality of plate filters and the paper extracter means is located at the second end of a last of the plurality of plate filters, whereby a single paper extracter means pulls the filter medium simultaneously between the filter plates of all filters.

* * * * *